2,999,107
PREPARATION OF ADIPONITRILE BY HYDROGENATION OF 1,4-DICYANOBUTENES

Richard Vernon Lindsey, Jr., Hockessin, and Halsey Bidwell Stevenson, Wilmington, Del., assignors to E. I. du Pont de Nemours and Company, Wilmington, Del., a corporation of Delaware
No Drawing. Filed July 9, 1959, Ser. No. 825,869
7 Claims. (Cl. 260—465.8)

This invention relates to a process for the catalytic hydrogenation of 1,4-dicyanobutenes, and, more specifically, it relates to a process for the catalytic hydrogenation of 1,4-dicyanobutenes under homogeneous conditions using rhodium chloride as the soluble catalyst and obtaining adiponitrile as the product of hydrogenation.

The high molecular weight, linear polyamides in which carboxamide groups are an integral part of the polymer chains were the first commercially-successful synthetic polymers useful for conversion to films, fibers, and the like. Generically, these polymers are referred to as nylons. They are now widely used as thermoplastic resins as well as in textiles, bristles, and films. Many commercially important nylons require hexamethylenediamine as one ingredient. A particularly important nylon of this type is 66-nylon obtained from the reaction of hexamethylenediamine with adipic acid. One process which is employed commercially for the preparation of hexamethylenediamine is the hydrogenation of adiponitrile which has been produced by the selective hydrogenation of the 1,4-dicyanobutene isomers obtained from the dichlorobutenes produced by the addition of chlorine to butadiene-1,3. Thus adiponitrile is a key polyamide intermediate.

A gas phase process for the hydrogenation of 1,4-dicyanobutenes to adiponitrile over supported palladium catalysts is disclosed in U.S. Patent 2,532,311 issued on December 5, 1950 to M. W. Farlow and B. W. Howk. A liquid phase process for the hydrogenation of the 1,4-dicyanobutenes to adiponitrile over supported palladium catalysts is disclosed in U.S. Patent 2,532,312 issued on December 5, 1950 to L. E. Romilly. In order for these processes to be economicaly feasible it is necessary that the 1,4-dicyanobutene fed to the hydrogenation units be of very high purity and free from organic chloride and other catalyst poisons such as cuprous chloride in order to obtain a sufficiently long life for the palladium catalyst. This purity requirement adds greatly to the cost of the process since it is necessary to provide for a costly refining step. The highly competitive nature of the synthetic textile and plastic industry compels a continuing search for ways to reduce the cost of manufacture of nylon intermediates such as adiponitrile. Thus a need has long been felt for the discovery of a process effective for the hydrogenation in high yield of crude 1,4-dicyanobutenes to adiponitrile, thus eliminating the costly refining step.

One object of the present invention is to provide a process for the hydrogenation of a crude mixture of the isomers of 1,4-dicyanobutene. Another object is to provide a liquid-phase process for the hydrogenation of 1,4-dicyanobutenes to adiponitrile in the presence of catalyst poisons such as organic chlorides and cuprous chloride. A still further object is to provide a process for homogeneous, liquid-phase hydrogenation of 1,4-dicyanobutenes to adiponitrile by the use of a soluble catalyst. Other objects and advantages of this invention will appear hereinafter.

It has now been found that 1,4-dicyanobutene isomers can be successfully hydrogenated to adiponitrile (1,4-dicyanobutane), even in the presence of organic chlorides and cuprous chloride, which act as poisons for conventional catalysts, by effecting the hydrogenation in a system which employs a rhodium catalyst. In a preferred specific embodiment the hydrogenation is caried out with a rhodium chloride catalyst in a medium which is a solvent for the rhodium chloride at temperatures above 25° C. The process generally is carried out at pressures in excess of atmospheric, usually between about 4 and 1000 atmospheres.

The 1,4-dicyanobutenes hydrogenated in accord with the process of this invention may be prepared by the reaction of sodium cyanide with the dichlorobutenes obtained from the chlorination of butadiene-1,3 as described in U.S. Patents 2,462,388 and 2,477,597. The principal product obtained initially upon cyanation of the dichlorobutene is the mixture of solid trans- and liquid cis-1,4-dicyano-2-butenes, but a subsequent treatment of this product with a basic material such as trimethylamine, as described in U.S. Patent 2,570,794, produces a liquid equilibrium mixture of the isomers, cis-1,4-dicyano-1-butene, trans-1,4-dicyano-1-butene, and 1,4-dicyano-2-butene. Some of the structural isomer, 1,2-dicyano-2-butene, may also be found in the reaction products subjected to hydrogenation. This liquid mixture, as well as the original semi-solid product, 1,4-dicyano-2-butene, may be employed in the subsequent hydrogenation to give adiponitrile according to the process of this invention.

The process of this invention employs a rhodium catalyst. Particularly preferred are the rhodium halides, e.g. the chloride and bromide, rhodium chelates, e.g., rhodium (III) acetylacetonate, rhodium (III) ethyl acetoacetate, bis(2-pyridinealdehyde)rhodium (III) chloride, etc., and the rhodium carbonyl halides, e.g. rhodium (III) carbonyl chloride, etc. When rhodium chloride is used, it is generally of commercial quality but if desired, it can be the chemically pure product. In practice, the trihydrate of rhodium chloride

$$(RhCl_3 \cdot (H_2O)_3)$$

can be employed conveniently.

The minimum amount of rhodium catalyst which can be employed in the process of this invention is about 0.0001% by weight of the 1,4-dicyanobutene, calculated as metallic rhodium. Usually better results are obtained when at least about 0.01% and preferably from about 0.05% to about 0.2% by weight catalyst is used. No advantage accrues from the use of amounts of catalyst in excess of about 1% by weight of the 1,4-dicyanobutene, calculated as metallic rhodium, and this constitues a practical upper limit.

In a preferred embodiment, the process is operated in a medium which is inert to the hydrogenation conditions and which is a solvent both for the rhodium catalyst and for the 1,4-dicyanobutene under the conditions of the reaction. Suitable solvents are the lower alkanols, containing from one, up to and including seven carbon atoms, and the polyethers. A few specific examples of such solvents are methanol, ethanol, propanols, butanols, pentanols, hexanols, heptanols, and the mono- and dimethyl ethers of ethylene glycol and diethylene glycol. Cycloalkanols such as cyclohexanol may also be employed.

The proportion of reaction medium is not critical. It can be less than, equal to, or in excess of the proportion of 1,4-dicyanobutene by many fold. Generally, for best results, the proportion of solvent medium should be at least as large as 50 parts by weight solvent to 100 parts by weight of dicyanobutene, i.e., 33% by weight of solvent based on the total weight of solvent plus dicyanobutenes. For practical purposes, proportions of solvent greater than about five times the weight of the dicyanobutenes offer no advantage and unduly increase the volume of solution to be processed, so a practical upper limit for the proportion is about 500 parts by weight solvent to 100 parts by weight dicyanobutenes, or about 83% by weight solvent based on the total weight of solvent plus dicyanobutenes.

The hydrogenation process of this invention may be operated at temperatures in the range of 25° to 150° C. The best balance of product yield and reaction rate is achieved within the range of 50° to 125° C. which embraces the preferred temperature conditions. At temperatures above 150° C. the cyano groups and the olefinic unsaturation are hydrogenated. Reduction of the cyano groups results in the formation of amino groups and this brings about catalyst deactivation and lower yield of desired product.

One convenient method for effecting the hydrogenation process of this invention is by a batch procedure. This method is described below and is illustrated in the detailed examples.

A reactor of 400-milliliter capacity capable of withstanding elevated pressures is charged with 1,4-dicyanobutene (any isomer or mixture of isomers) and a reaction medium in any of the proportions already indicated. The total volume of this liquid charge should not be greater than about 200 ml., 50% of the total volume of the reactor. Before charging, at least 0.0001% of rhodium catalyst, calculated as metallic rhodium, and based on the weight of the 1,4-dicyanobutene, is added. The reactor is cooled to 0° C., swept with oxygen-free nitrogen, and then evacuated. The charged reactor is placed on a rocker mechanism and connected to a source of high pressure hydrogen. Hydrogen is injected, heating and agitation are started, and the pressure within the reactor is adjusted with hydrogen so that, at a temperature of from 25° C. to 150° C., the pressure within the reactor is above atmospheric, preferably above 4 atmospheres and usually between about 100 atmospheres and about 1000 atmospheres. When the reaction is complete, as evidenced by cessation of pressure drop, the charge is allowed to cool to ambient temperature, the pressure is released, and the reactor opened to discharge the contents. The product, adiponitrile, is recovered from the reaction mixture by fractional distillation or by any other familiar method of separation.

The examples which follow are illustrative of preferred modes for carrying out this invention and are not intended as limitations of the invention. The reactor employed in all instances was of 400 ml. capacity. That is, it corresponds to a volume of about 400 ml. of water at 25° C. In the following examples, all parts are by weight:

Example I

A solution prepared from 106 parts 1,4-dicyano-1-butene of 98.4% purity, 76 parts methanol and 0.2 part rhodium chloride trihydrate was placed in a silver-lined shaker reactor with a free space equal to the volume of the solution. The reactor was heated to 75° C. and pressured with 500 atm. of hydrogen. The pressure dropped 105 atm. in five hours, whereupon the temperature was increased to 100° C. The pressure dropped 90 atm. in the next 2½ hours, the total pressure drop corresponding roughly to 2.5 parts of hydrogen. After cooling and releasing the pressure, the contents of the reactor were found to be a clear yellow solution, which left no colored deposit on being passed through a fine white filter paper. The solution was distilled to yield methanol and 91 parts of adiponitrile, B.P. 170–180° C. at 28 mm.; $n_D^{25}$, 1.4375, a yield of 86%, based on the charge. The distillation residue consisted of 2 parts of black solid containing rhodium.

Example II

A solution of 106 parts of 1,4-dicyano-1-butene [1] containing ca. 5% of 1,2-dicyano-2-butene and soluble tars, 76 parts methanol, and 0.2 part rhodium chloride trihydrate was reacted with hydrogen in a silver-lined shaker reactor at 100° to 125° C. and 500 atm. pressure. The total pressure drop in 7½ hours was 160 atm., which corresponds to an uptake of 2.1 parts of hydrogen. The product was a clear greenish brown solution, from which 95 parts of adiponitrile, a yield of 88%, based on the charge, B.P. 177–178° C. at 26 mm.; $n_D^{25}$, 1.4365, was recovered. A rhodium mirror was deposited in the vessel from which the adiponitrile was distilled.

Example III

A solution of 106 parts of 1,4-dicyano-1-butene of 98.4% purity, 76 parts methanol and 0.4 part of rhodium chloride trihydrate was hydrogenated at 75° to 100° C. and 1000 atm. pressure. A total pressure drop of 175 atm. was observed in 1½ hours, which corresponds to an uptake of 2.3 parts hydrogen. The clear, light yellow solution obtained was divided into two portions. The first portion of 79 parts was distilled to give 44 parts of adiponitrile, B.P. 174–175° C. at 23 mm.; $n_D^{25}$, 1.4363. To the second portion of 96 parts was added 106 parts of 1,4-dicyano-1-butene of 98.4% purity and the solution was hydrogenated at 75–100° C. and 1000 atm. An observed pressure drop of 180 atm. in two hours corresponds to an uptake of 2.2 parts of hydrogen. Distillation of the clear, light yellow product gave 151 parts of adiponitrile, B.P. 176–177° C. at 25 mm.; $n_D^{25}$, 1.4364. This example shows that the rhodium chloride catalyst retains its activity.

Example IV

A solution of 53 parts trans-1,4-dicyano-2-butene, M.P. 77° to 78° C., 120 parts methanol, and 0.2 part rhodium chloride trihydrate was reacted with hydrogen at 75° C. to 100° C. and 950 atm. A total pressure drop of 110 atm. in one hour corresponded to an uptake of about 1.4 parts of hydrogen. The clear, yellow liquid product on distillation gave 48 parts of adiponitrile, a yield of 89%, B.P. 176–177° C. at 25 mm.; $n_D^{25}$, 1.4362.

Example V

A total reaction mixture obtained from the reaction between 1,4-dichloro-2-butene and sodium cyanide in the presence of cuprous chloride and water which contains dicyanobutenes, was separated into an organic layer and an aqueous layer. The organic layer was washed with water until the washings gave no precipitate on addition of silver nitrate, showing that chloride and cyanide ions had been removed. The organic residue, on analysis, was shown to consist of approximately 90–92% cis- and trans-1,4-dicyano-2-butenes, 5% 3,4-dicyano-1-butene, 2% cyanoprene, 1% chlorocyanobutene, 0.5% cyanohydroxybutene, and lesser amounts of dichlorobutene and tetrachlorobutane.

A solution of 90 parts of the above washed crude 1,4-dicyano-2-butene, 120 parts methanol, and 0.2 part rhodium chloride trihydrate was hydrogenated at 75° to 100° C. at a pressure in the range of 500 to 875 atmospheres. The pressure drop observed was 180 atmospheres, equivalent to the uptake of 1.2 parts of hydrogen. The reaction mixture was distilled to give 53 parts of adiponitrile, a yield of 64%, based on the charge, B.P. 172–175° C. at 24 mm. of mercury; $n_D^{25}$, 1.4368.

Example VI

One hundred six parts 1,4-dicyano-1-butene of 98.4% purity and 0.2 part rhodium chloride trihydrate were hydrogenated at 100° C. and 875 atm. A pressure drop of 100 atm. in 3 hours corresponded to an uptake of 1.95

[1] Obtained by treating crude dicyanobutenes with trimethylamine as described in U.S. Patent 2,570,794.

parts of hydrogen. The light brown product was filtered to remove some suspended catalyst and distilled at 163–174° C. at 24 mm. to give 97 parts of a mixture consisting of 87% adiponitrile and 13% unhydrogenated 1,4-dicyano-1-butene.

Example VII

To a solution of 0.2 part rhodium chloride trihydrate in 100 parts absolute ethanol was added 106 parts 1,4-dicyano-1-butene of 98.4% purity. The ethanol was then removed by evacuating to 1 mm. pressure at 50° C., leaving a yellow solution of rhodium chloride in 1,4-dicyano-1-butene. Thie was hydrogenated at 100–125° C. at 500–800 atm. pressure. A pressure drop of 105 atm. corresponded to an uptake of 2.0 parts hydrogen. A trace of black solid, amounting to 0.015 part, was removed from the product and the clear yellow filtrate was distilled to give 92 parts adiponitrile, B.P. 175–177° C. at 25 mm.; $n_D^{25}$, 1.4368.

Example VIII

A yellow solution comprising 106 parts 1,4-dicyano-1-butene of 98.4% purity, 80 parts diethylene glycol dimethyl ether, 20 parts water and 0.2 part rhodium chloride trihydrate was treated with hydrogen at 100° C. and 950 atm. The pressure drop of 185 atm. in 4 hours corresponded to an uptake of 2.36 parts hydrogen. The slightly turbid product was distilled to give 99.5 parts adiponitrile, B.P. 175–177° C. at 25 mm.; $n_D^{25}$, 1.4363.

Example IX

A solution of 0.5 part rhodium tris-acetylacetonate (rhodium III acetylacetonate) in 106 parts 1,4-dicyano-1-butene was hydrogenated at 100–150° C. at 750–880 atm. The pressure drop of 125 atm. corresponded to an uptake of 2.3 parts hydrogen. The yellow solution was distilled at 85–87° C. at 0.10 mm. to give 95 parts of a product which analyzed for 95% adiponitrile.

Example X

To a solution of 106 parts 1,4-dicyano-1-butene similar to that described in Example II in 83 parts toluene was added 2 parts of a rhodium catalyst made by depositing 0.1 part rhodium trichloribde on silica gel followed by treatment with a basic ion exchange resin. The resulting suspension was treated with hydrogen at 50–67° C. at 750 atm. pressure. The absorbed pressure drop was 160 atm. in 3½ hours, which corresponded to an uptake of 2.3 parts hydrogen. The catalyst was removed by fitration and the filtrate was distilled to give 96 parts adiponitrile; $n_D^{25}$, 1.4370.

The catalyst recovered as described above was added to another solution of 106 parts amine-treated [2] 1,4-dicyano-1-butene in 83 parts toluene and the suspension was treated with hydrogen at 48–75° C. at 750 atm. The pressure drop was 150 atm. in 3 hours, which corresponded to an uptake of 2.1 parts hydrogen. The catalyst was filtered off and the fitrate was distilled to give 96 parts adiponitrile.

Rhodium is unique as a catalyst for the hydrogenation of dicyanobutenes in being highly selective in its activity and in being active in the presence of ions which act as poisons for other noble metal catalysts, e.g. ruthenium, platinum, and iridium. This is shown by the following specific examples.

Example A

A solution of 106 parts of 1,4-dicyano-1-butene of 98.4% purity, 90 parts 2,5,8-trioxanonane and 0.2 part of ruthenium chloride trihydrate was reacted with hydrogen at 80° to 100° C. and 987 atm. A total pressure drop of 25 atm. in eight hours corresponds to an uptake of only 0.3 part of hydrogen. The product was a somewhat viscous brown liquid containing a dense black precipitate of uthenium, which was removed by filtration.

[2] As in U.S. 2,570,794.

The filtrate on distillation gave a mixture of ca. 30% adiponitrile and ca. 70% 1,4-dicyano-1-butene.

Example B

A solution of 0.2 part chlorplatinic acid in 106 parts 1,4-dicyano-1-butene of 98.4% purity was hydrogenated at 125° C. and 850 atm. A pressure drop of 40 atm. in 7½ hours corresponds to an uptake of about 0.7 part of hydrogen. The product was a brown liquid containing 0.02 part of suspended platinum which was filtered off. Distillation of the filtrate showed it contained ca. 18 parts of adiponitrile, 62 parts of 1,4-dicyano-1-butene and 15 parts of a non-volatile tar.

Example C

A solution of 106 parts of 1,4-dicyano-1-butene of 98.4% purity, 76 parts methanol and 0.2 part iridium trichloride was hydrogenated at 125° C. and 890 atm. The hydrogen uptake in 10½ hours corresponded to approximately 0.9 part of hydrogen. The clear brown solution on distillation gave a mixture containing 35 parts adiponitrile and 45 parts unchanged 1,4-dicyano-1-butene.

Although in the foregoing examples the hydrogenation has been carried out as a batch operation, it is to be understood that it can be conducted also as a continuous or semi-continuous operation.

The process of this invention is effective for converting the 1,4-dicyanobutenes to adiponitrile in high yields without reducing the cyano groups to amino groups, a result which is undesirable since such amine compounds act to destroy the activity of the catalyst. It is believed that the low temperature at which rhodium catalysts have been found to be effective for reducing the olefinic unsaturation in 1,4-dicyanobutenes is at least in part responsible for the selective hydrogenation accomplished. The yields obtained are high, being above 60% in all cases, and, depending upon the conversion, the yield can be as high as 95% to 99%. In continuous operations it is often better to operate under conditions of maximum yield with somewhat lower than maximum conversion, recovering and recycling the unconverted 1,4-dicyanobutenes. In batch operations, somewhat higher conversions and yields in the range of 65% to 90% may be preferable for reducing the amount of unconverted, 1,4-dicyanobutenes which must be recovered and recycled.

We claim:

1. A process for the hydrogenation of 1,4-dicyanobutene isomers in the liquid phase to adiponitrile which comprises reacting the said 1,4-dicyanobutenes with hydrogen under pressure in the range of 4 to about 1000 atmospheres in the presence of from about 0.0001% to about 1% by weight, based on the weight of 1,4-dicyanobutene, and calculated as metallic rhodium, a rhodium catalyst selected from the group consisting of rhodium halides, rhodium chelates, and rhodium carbonyl halides at a temperature of from 25° to 150° C., and recovering adiponitrile from the reaction mixture.

2. A process for the hydrogenation of 1,4-dicyanobutene isomers to adiponitrile in the liquid phase which comprises reacting said 1,4-dicyanobutenes with hydrogen under pressure in the range of 100 to 1000 atmospheres in the presence of from 0.01% to 1% by weight of a rhodium catalyst, selected from the group consisting of rhodium halides, rhodium chelates, and rhodium carbonyl halides, and based on the weight of the 1,4-dicyanobutenes and calculated as metallic rhodium, at a temperature in the range of 25° to 150° C., and recovering adiponitrile from the reaction mixture.

3. A process according to claim 1 in which the catalyst is rhodium chloride trihydrate.

4. A process according to claim 1 in which the 1,4-dicyanobutenes are crude products.

5. A process for the homogeneous, liquid phase hydrogenation of 1,4-dicyanobutene isomers to adiponitrile which comprises dissolving the said 1,4-dicyanobutenes and from about 0.05% to about 0.2% by weight, based on the weight of 1,4-dicyanobutene and calculated as metallic rhodium, of a rhodium catalyst, selected from the group consisting of rhodium halides, rhodium chelates, and rhodium carbonyl halides, in a common solvent which is inert to the hydrogenation conditions and subjecting the homogeneous solution to agitation under a pressure in the range of 100 to 1000 atmospheres of hydrogen at a temperature in the range of 25° to 150° C., and recovering adiponitrile from the homogeneous reaction mixture.

6. A process according to claim 5 in which the rhodium catalyst is rhodium chloride trihydrate.

7. A process according to claim 5 in which the rhodium catalyst is rhodium (III) acetylacetonate.

References Cited in the file of this patent

UNITED STATES PATENTS

| | | |
|---|---|---|
| 2,523,312 | Romilly | Dec. 5, 1950 |
| 2,867,628 | Cass | Jan. 6, 1959 |

OTHER REFERENCES

Dunworth et al.: J.A.C.S., volume 74 (1952), pages 1457–1459.

Hernandez et al.: C. A., volume 42 (1948), page 1793, e, f, g.

UNITED STATES PATENT OFFICE

CERTIFICATE OF CORRECTION

Patent No. 2,999,107            September 5, 1961

Richard Vernon Lindsey, Jr., et al.

It is hereby certified that error appears in the above numbered patent requiring correction and that the said Letters Patent should read as corrected below.

Column 5, line 43, for "trichloribde" read -- trichloride --; line 74, for "uthenium" read -- ruthenium --; column 8, line 7, for "2,523,312" read -- 2,532,312 --.

Signed and sealed this 20th day of February 1962.

(SEAL)
Attest:

ERNEST W. SWIDER            DAVID L. LADD
Attesting Officer            Commissioner of Patents